UNITED STATES PATENT OFFICE.

ALFRED AMMELBURG, OF HÖCHST-ON-THE-MAIN, GERMANY, ASSIGNOR TO THE FARBWERKE, VORM. MEISTER, LUCIUS & BRÜNING, OF HÖCHST-ON-THE-MAIN, GERMANY, A CORPORATION.

ACID COMPOUND OF DIMETHYLAMIDODIMETHYLPHENYLPYRAZOLON AND PROCESS OF MAKING SAME.

SPECIFICATION forming part of Letters Patent No. 686,999, dated November 19, 1901.

Application filed December 21, 1900. Serial No. 40,662. (Specimens.)

*To all whom it may concern:*

Be it known that I, ALFRED AMMELBURG, Ph. D., a citizen of the Empire of Germany, residing at Höchst-on-the-Main, Germany, have invented an Acid Compound of Dimethylamidodimethylphenylpyrazolon and Process of Making the Same, of which the following is a specification.

I have found that by combining dimethylamidodimethylphenylpyrazolon with camphoric acid a new and useful therapeutic compound may be obtained. The manufacture of this compound is only possible under certain conditions—namely, if mixed solutions of dimethylamidodimethylphenylpyrazolon and camphoric acid be concentrated without access of moisture, light, and heat. If these precautions are neglected, products will be obtained of a more or less yellow color and bad crystallization and which change still more on being kept apparently on account of the decomposition causing the yellow color.

The new compound combines the therapeutic properties of dimethylamidodimethylphenylpyrazolon and camphoric acid, showing, besides, the antipyretic action of dimethylamidodimethylphenylpyrazolon, also the antihydrotic action of camphoric acid. Pharmacological and clinical experiments have shown that the combination of dimethylamidodimethylphenylpyrazolon and camphoric acid has quite a different action from what was to be expected. A mere superposition of the action of the components does not take place; but their effect in the new compound is modified, inasmuch as the antihydrotic action of the camphoric acid is greatly increased, while the toxical action of dimethylamidodimethylphenylpyrazolon is reduced. For instance, the desired antipyretic action is obtained with phthisical people with 1.0 gram of acid camphorate of dimethylamidodimethylphenylpyrazolon, (corresponding to 0.47 grams of camphoric acid and 0.53 grams of dimethylamidodimethylphenylpyrazolon,) causing the secretion of perspiration to cease at the same time, while to produce the desired effect with camphoric acid alone one-half gram is generally employed, whereas 0.5 gram is considered as the maximum dose of dimethylamidodimethylphenylpyrazolon.

I illustrate my process as follows: Twenty-five kilos of thoroughly dry dimethylamidodimethylphenylpyrazolon are dissolved in one hundred and fifty kilos of dried ether, to which is added an anhydrous solution of 21.645 kilos of camphoric acid in eighty-six kilos of ether. The solution of the camphoric acid and dimethylamidodimethylphenylpyrazolon is condensed at ordinary temperature *in vacuo* without access of light when the camphorate of dimethylamidodimethylphenylpyrazolon separates as warty aggregates. The separated acid salt is filtered, washed with ligroin, and dried *in vacuo* at low temperature with sulfuric acid.

The acid camphorate of dimethylamidodimethylphenylpyrazolon has the melting-point 94° centigrade. The theoretical nitrogen is 12.69 per cent., whereas the actual yield is 12.78 per cent.

Having now described my invention, what I claim is—

1. The herein-described process of making an acid compound of camphoric acid and dimethylamidodimethylphenylpyrazolon, which consists in concentrating a mixed anhydrous solution of these two compounds in the dark and at ordinary temperature, substantially as set forth.

2. As a new product, the acid compound of diamethylamidodimethylphenylpyrazolon with camphoric acid, being a white crystalline powder, easily soluble in water, almost tasteless, and having the melting-point 94° centigrade, substantially as set forth.

In testimony that I claim the foregoing as my invention I have signed my name in presence of two subscribing witnesses.

ALFRED AMMELBURG.

Witnesses:
ALFRED BRISBOIS,
JEAN GRUND.